(12) United States Patent
Echizen et al.

(10) Patent No.: US 6,728,408 B1
(45) Date of Patent: Apr. 27, 2004

(54) WATER-MARK EMBEDDING METHOD AND SYSTEM

(75) Inventors: Isao Echizen, Yokohama (JP); Hiroshi Yoshiura, Tokyo (JP); Masafumi Nakamura, Yokohama (JP); Takao Arai, Yokohama (JP); Toshifumi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/144,467

(22) Filed: Sep. 1, 1998

(30) Foreign Application Priority Data

Sep. 3, 1997 (JP) .............................. 9-238030
Apr. 16, 1998 (JP) .......................... 10-106037

(51) Int. Cl.$^7$ .......................... G06K 9/00; G06K 9/46; G06K 9/32; H04L 9/00
(52) U.S. Cl. ...................... 382/232; 382/100; 382/294; 713/176
(58) Field of Search ................. 382/100, 232, 382/238, 135, 282, 284, 294, 233, 154, 275, 289, 295, 296; 380/200, 34, 51, 201, 252, 287, 210; 345/419, 629, 634; 235/469; 707/104.1; 713/129, 126

(56) References Cited

U.S. PATENT DOCUMENTS

| | | | |
|---|---|---|---|
| 5,530,759 A | 6/1996 | Braudaway et al. | 380/54 |
| 5,561,724 A | 10/1996 | Kido et al. | 382/264 |
| 5,568,570 A | 10/1996 | Rabbani | 382/238 |
| 5,606,609 A | 2/1997 | Houser et al. | 713/179 |
| 5,636,292 A | 6/1997 | Rhoads | 382/232 |
| 5,721,788 A | 2/1998 | Powell et al. | 382/100 |
| 5,737,417 A | 4/1998 | Buynak et al. | 380/204 |
| 5,748,763 A | 5/1998 | Rhoads | 382/115 |
| 5,822,425 A | 10/1998 | Ezaki et al. | 386/94 |
| 5,848,155 A | 12/1998 | Cox | 380/34 |
| 5,859,920 A | 1/1999 | Daly et al. | 382/115 |
| 5,889,868 A | 3/1999 | Moskowitz et al. | 380/51 |
| 5,905,819 A | 5/1999 | Daly | 382/284 |
| 5,960,081 A | 9/1999 | Vynne et al. | 380/10 |
| 6,005,643 A | 12/1999 | Morimoto et al. | 380/201 |

FOREIGN PATENT DOCUMENTS

| | | |
|---|---|---|
| EP | 0581317 | 2/1994 |
| EP | 0612054 | 8/1994 |
| EP | 0651554 | 5/1995 |
| EP | 0766466 | 4/1997 |
| EP | 805600 | 11/1997 |
| EP | 840513 | 5/1998 |
| JP | 66329 | 1/1994 |
| JP | 8161483 | 6/1996 |
| JP | 9130766 | 5/1997 |

(List continued on next page.)

OTHER PUBLICATIONS

G. Caronni, "Assuring Ownership Rights for Digital Images" Published in the proceedings of 'reliable IT systems' VIS '95, edited by Brueggemann, H.H and Gerhardt–Haeckl, W. Vieweg Publishing Company, Germany 1995, pp. 1–10.

(List continued on next page.)

Primary Examiner—Leo Boudreau
Assistant Examiner—Duy M. Dang
(74) Attorney, Agent, or Firm—Antonelli, Terry, Stout & Kraus, LLP

(57) ABSTRACT

A data embedding method and apparatus and a data reproducing method and apparatus are provided which can apply a digital watermark to various contents. Instead of embedding watermarking information in respective pixels or by using a relation between pixels, the watermarking information is embedded as a position pattern of changed pixels in the contents. Reliability comparable with conventional techniques can be obtained irrespective of a change in a smaller number of pixels for the contents.

25 Claims, 19 Drawing Sheets

FOREIGN PATENT DOCUMENTS

| | | | |
|---|---|---|---|
| JP | 9-238031 | * | 9/1997 |
| WO | 9520291 | | 7/1995 |
| WO | 9625005 | | 8/1996 |
| WO | 9636163 | | 11/1996 |
| WO | 9641468 | | 12/1996 |
| WO | 9714249 | | 4/1997 |
| WO | 9827510 | | 6/1998 |

OTHER PUBLICATIONS

O. Ruanaidh, "Watermarking digital images for copyright protection" IEEE Proceedings on Vision, Signal and Image Processing, vol. 143, No. 4, 1996, pp. 250–256.

Bender et al, Techniques for Data Hiding, IBM Systems Journal, vol. 35, Nos. 3 & 4, 1996, pp. 313–335.

"Data Hiding Technology for Supporting Electronic Water Mark (Upper)", pp. 149–162, Nikkei Electronics 1997.2.24 (No. 683), By Nikkei Business Pub., Inc.

Pixel Block Coding for Digital Still Images, by S. Shimizu, et al, pp. 257–262.

W. Bender, et al., Techniques for Data Hiding, IBM Systems Journal, vol. 35, Nos. 3&4, 1996, pp. 313–335.

K. Kido, et al "Improvement of MRI Image Quality by a Directional Adaptive Filter", Systems and Computers in Japan, vol. 28, No. 10, 1997, 99–69–76.

Papers of IEICE of Japan, D–II vol. J79–D–11, No. 8, pp. 1347–1353.

Nikkei Electronics 1997.2.24 (683) pp. 99–107 "Digital Watermark protects multi–media age".

W. Pennebake et al, "Still Image Data Compression Standard" JPEG, pp. 335–353.

Bors and Pitas: "Image Watermarking using DCT Domain Constraints" Proceeding of 3rd IEEE International Conference on Image Processing, Sep. 16–19, 1996, pp. 231–234, XP002095507, New York, NY, US.

W. Pennebaker et al, "Still Image Data Compression Standard" JPEG, pp 335–353.

* cited by examiner

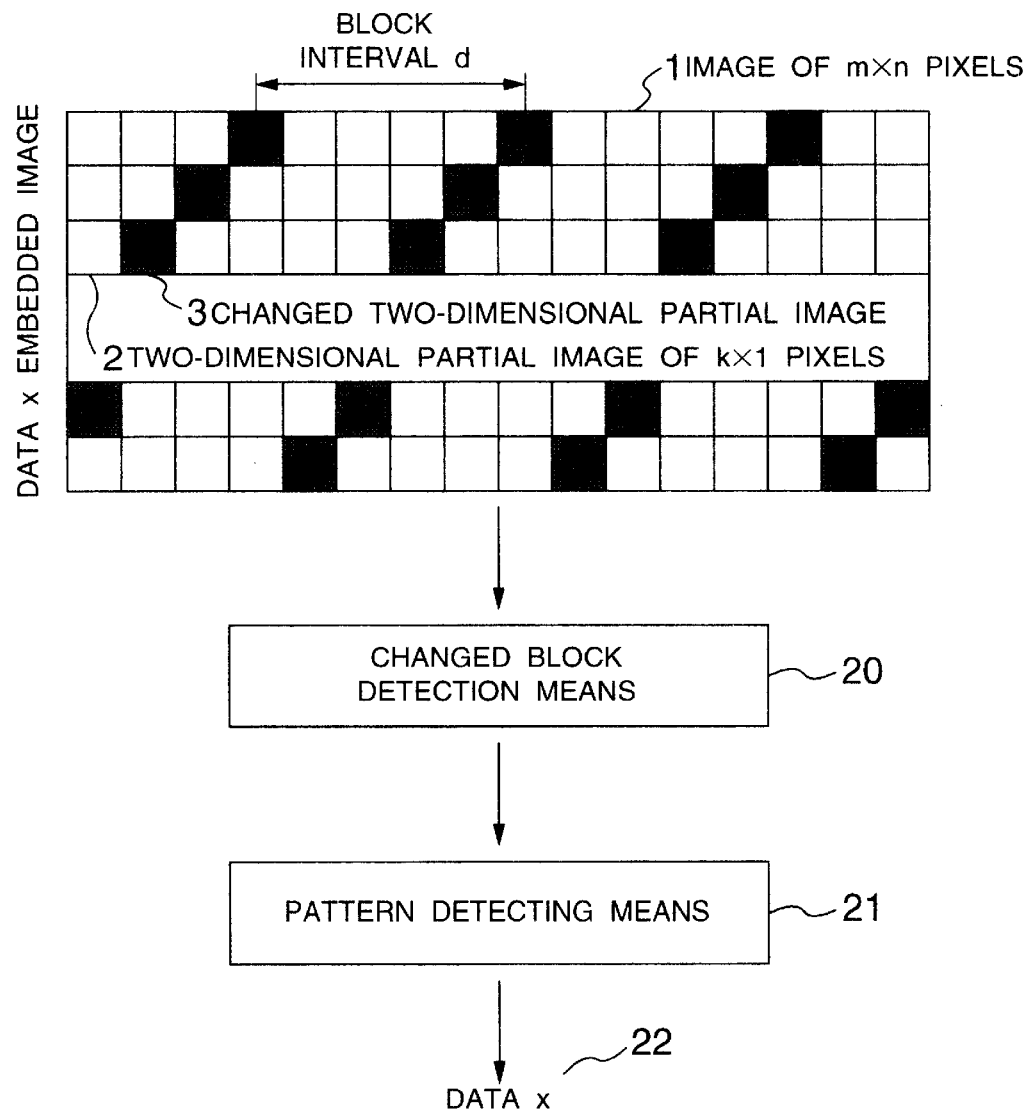

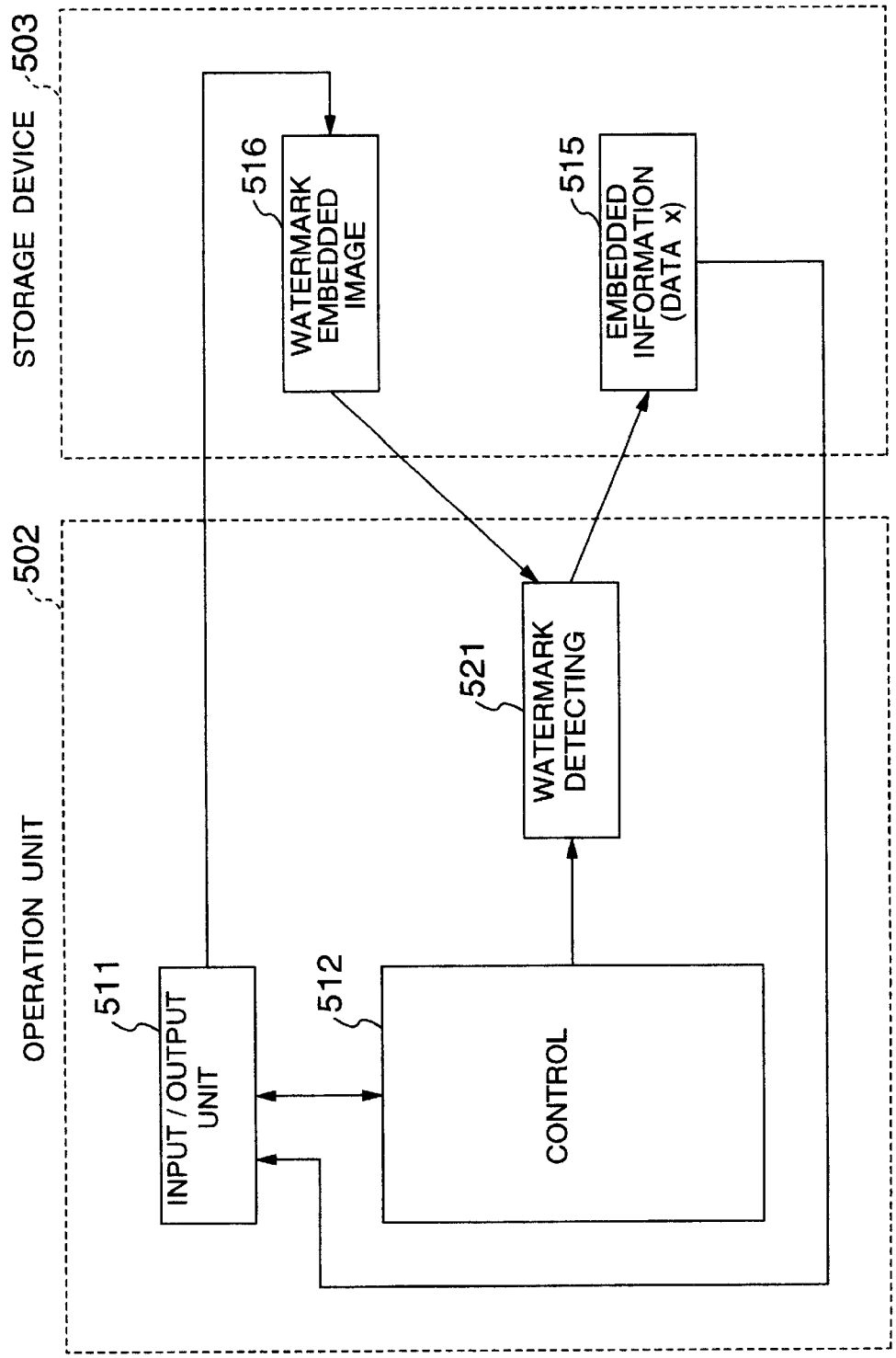

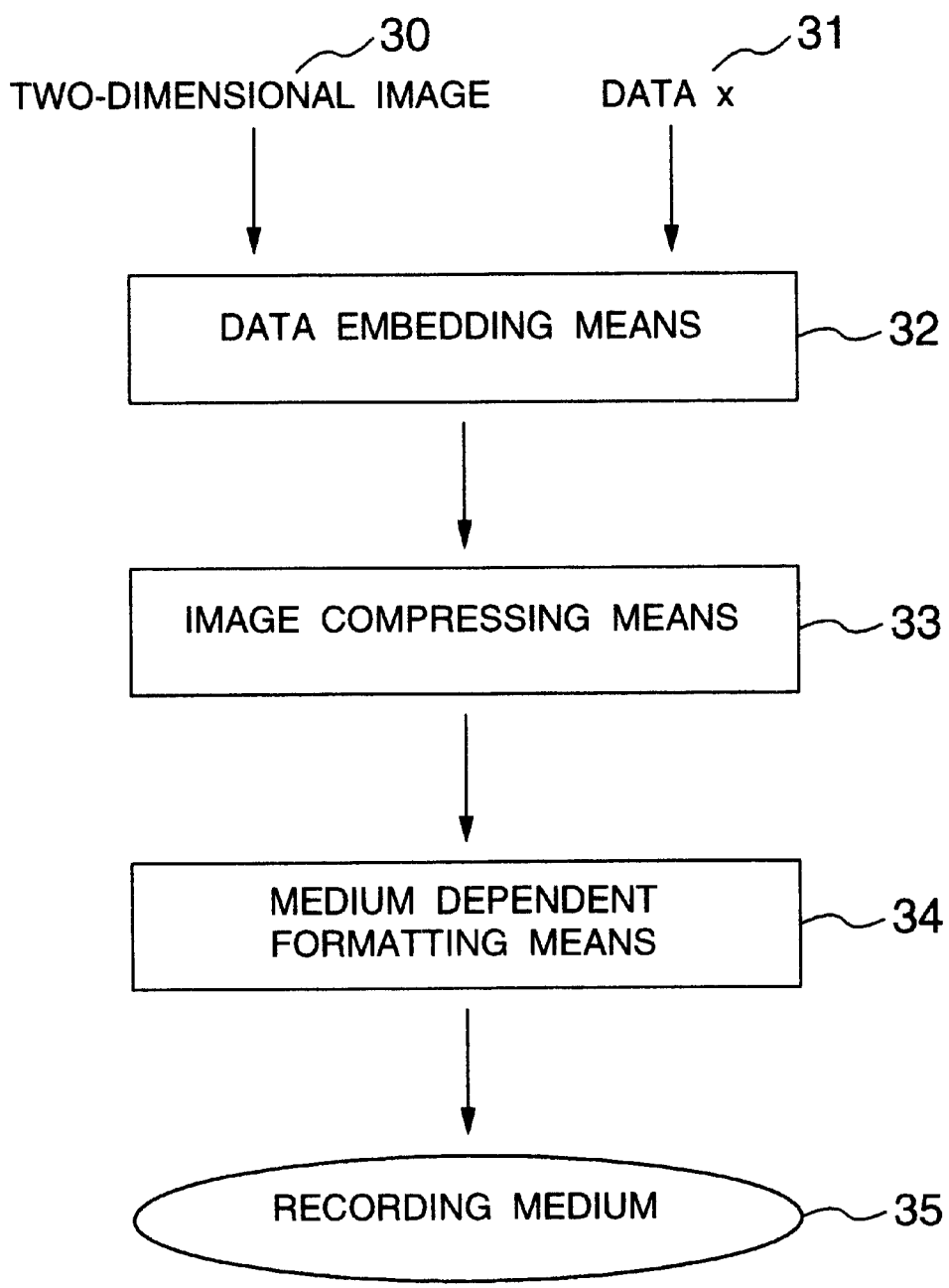

| DATA x | BLOCK PATTERN | BLOCK PATTERN NUMBER |
|---|---|---|
| 000000 | B1 2, B2 64 ⋯ , B84 34 | BLOCK PATTERN 1 |
| 000001 | B1 32, B2 17 ⋯ , B84 21 | BLOCK PATTERN 2 |
|  |  |  |
| X | B1 A1, B2 A2, ⋯ , Bn An, ⋯ , B84 a84 | BLOCK PATTERN p |
|  |  |  |
| 111111 | B1 63, B2 28 ⋯ , B84 3 | BLOCK PATTERN 64 |

An IS A RANDOM NUMBER SERIES FROM 1 TO 64

FIG. 15

| | MACRO BLOCK 1 | MACRO BLOCK 2 | MACRO BLOCK 84 |
|---|---|---|---|
| BLOCK PATTERN 1 | B1 1 \| B1 2 \| B1 3 \| ... \| B1 64 | B2 1 \| B2 2 \| B2 3 \| ... \| B2 64 | B84 1 \| B84 2 \| B84 3 \| ... \| B84 64 |
| BLOCK PATTERN 2 | B1 1 \| B1 2 \| B1 3 \| ... \| B1 64 | B2 1 \| B2 2 \| B2 3 \| ... \| B2 64 | B84 1 \| B84 2 \| B84 3 \| ... \| B84 64 |
| BLOCK PATTERN 3 | B1 1 \| B1 2 \| B1 3 \| ... \| B1 64 | B2 1 \| B2 2 \| B2 3 \| ... \| B2 64 | B84 1 \| B84 2 \| B84 3 \| ... \| B84 64 |
| BLOCK PATTERN 64 | B1 1 \| B1 2 \| B1 3 \| ... \| B1 64 | B2 1 \| B2 2 \| B2 3 \| ... \| B2 64 | B84 1 \| B84 2 \| B84 3 \| ... \| B84 64 |
| BLOCK PATTERN 65 | B1 1 \| B1 2 \| B1 3 \| ... \| B1 64 | B2 1 \| B2 2 \| B2 3 \| ... \| B2 64 | B84 1 \| ... \| B84 20 \| B84 21 \| ... \| B84 64 |
| BLOCK PATTERN 66 | B1 1 \| B1 2 \| B1 3 \| ... \| B1 64 | B2 1 \| B2 2 \| B2 3 \| ... \| B2 64 | B84 1 \| ... \| B84 21 \| ... \| B84 64 |
| BLOCK PATTERN 67 | B1 1 \| B1 2 \| B1 3 \| ... \| B1 64 | B2 1 \| B2 2 \| B2 3 \| B2 4 \| ... \| B2 64 | B84 1 \| ... \| B84 21 \| ... \| B84 64 |
| BLOCK PATTERN 128 | B1 1 \| B1 2 \| B1 3 \| ... \| B1 64 | B2 1 \| B2 2 \| B2 3 \| ... \| B2 64 | B84 1 \| ... \| B84 19 \| B84 20 \| B84 21 \| ... \| B84 64 |

FIG. 16

| | MACRO BLOCK 1 | MACRO BLOCK 2 | ... | MACRO BLOCK 84 |
|---|---|---|---|---|
| BLOCK PATTERN 1 | B1 1 \| B1 2 \| B1 3 \| ... \| B1 64 | B2 1 \| B2 2 \| B2 3 \| ... \| B2 64 | ... | B84 1 \| B84 2 \| B84 3 \| ... \| B84 64 |
| BLOCK PATTERN 2 | B1 1 \| B1 2 \| B1 3 \| ... \| B1 64 | B2 1 \| B2 2 \| B2 3 \| ... \| B2 64 | ... | B84 1 \| B84 2 \| B84 3 \| ... \| B84 64 |
| BLOCK PATTERN 3 | B1 1 \| B1 2 \| B1 3 \| ... \| B1 64 | B2 1 \| B2 2 \| B2 3 \| ... \| B2 64 | ... | B84 1 \| B84 2 \| B84 3 \| ... \| B84 64 |
| BLOCK PATTERN 64 | B1 1 \| B1 2 \| B1 3 \| ... \| B1 64 | B2 1 \| B2 2 \| B2 3 \| ... \| B2 64 | ... | B84 1 \| B84 2 \| B84 3 \| ... \| B84 64 |
| BLOCK PATTERN 65 | B1 1 \| B1 2 \| B1 3 \| ... \| B1 64 | B2 1 \| B2 2 \| B2 3 \| ... \| B2 64 | ... | B84 1 \| B84 2 \| B84 3 \| ... \| B2 64 |
| BLOCK PATTERN 66 | B1 1 \| B1 2 \| B1 3 \| ... \| B1 64 | B2 1 \| B2 2 \| B2 3 \| ... \| B2 64 | ... | B2 1 \| B84 2 \| B84 3 \| ... \| B2 64 |
| BLOCK PATTERN 67 | B1 1 \| B1 2 \| B1 3 \| ... \| B1 64 | B2 1 \| B2 2 \| B2 3 \| ... \| B2 64 | ... | B2 1 \| B84 2 \| B84 3 \| ... \| B2 64 |
| BLOCK PATTERN 128 | B1 1 \| B1 2 \| B1 3 \| ... \| B1 64 | B2 1 \| B2 2 \| B2 3 \| ... \| B2 64 | ... | B2 1 \| B84 2 \| B84 3 \| ... \| B2 64 |

FIG. 17

| | MACRO BLOCK 1 | MACRO BLOCK 2 | ... | MACRO BLOCK 84 |
|---|---|---|---|---|
| BLOCK PATTERN 129 | B1:1 \| B1:2 \| B1:3 \| ... \| B1:64 | B2:1 \| ... \| B2:64 | ... | B2:1 \| B2:18 \| ... \| B2:64 |
| BLOCK PATTERN 130 | B1:1 \| B1:2 \| B1:3 \| ... \| B1:64 | B2:1 \| ... \| B2:13 \| ... \| B2:64 | ... | B2:1 \| ... \| B2:19 \| B2:64 |
| BLOCK PATTERN 131 | B1:1 \| B1:2 \| B1:3 \| ... \| B1:64 | B2:1 \| ... \| B2:14 \| ... \| B2:64 | ... | B2:1 \| ... \| B2:20 \| B2:64 |
| BLOCK PATTERN 192 | B1:1 \| B1:2 \| B1:3 \| ... \| B1:64 | B2:1 \| ... \| B2:11 \| ... \| B2:64 | ... | B2:1 \| ... \| B2:17 \| ... \| B2:64 |
| BLOCK PATTERN 193 | B1:1 \| B1:2 \| B1:3 \| ... \| B1:64 | B2:1 \| ... \| B2:14 \| ... \| B2:64 | ... | B2:1 \| ... \| B2:20 \| ... \| B2:64 |
| BLOCK PATTERN 194 | B1:1 \| B1:2 \| B1:3 \| ... \| B1:64 | B2:1 \| ... \| B2:15 \| ... \| B2:64 | ... | B2:1 \| ... \| B2:19 \| ... \| B2:64 |
| BLOCK PATTERN 195 | B1:1 \| B1:2 \| B1:13 \| ... \| B1:64 | B2:1 \| ... \| B2:16 \| ... \| B2:64 | ... | B2:1 \| ... \| B2:18 \| ... \| B2:64 |
| BLOCK PATTERN 256 | B1:1 \| B1:2 \| B1:3 \| ... \| B1:64 | B2:1 \| ... \| B2:64 | ... | B2:1 \| ... \| B2:18 \| ... \| B2:64 |

WATER-MARK EMBEDDING METHOD AND SYSTEM

CROSS-REFERENCE TO THE RELATED APPLICATION

This application relates to an application U.S. Ser. No. 09/144,989 being filed based on Japanese Patent Application No. 9-238031 filed on Sept. 3, 1997 by the present assignee. The disclosure of that application is herein incorporated by reference.

BACKGROUND OF THE INVENTION

1. Field of the Invention

The present invention relates to a method and system for embedding information such as a copyright notice in data, and more particularly to a digital watermark embedded in an image.

2. Description of the Related Art

Digital watermarking is applied to various contents. A watermark embedded in an image will be described by way of example. Information of a digital watermark is embedded in an image by modifying pixel values such as luminance components, and frequency components so that a set of images represents particular information of "0" or "1". In conventional techniques, for example, in "Still Image Data Hiding in Pixel Blocks", Shimizu et al., Proc. of IPSJ 53rd Annual Conference, 1996, the values of two pixels are changed minutely to represent "0" or "1" based upon a difference of values between two pixels. However, the following two conditions are required to be satisfied, when a digital watermark is to be embedded.

1) It is necessary that an image embedded with watermark information hardly changes from an original image (that the watermark is invisible).

2) It is necessary that embedded information is hard to be erased during an image conversion process such as JPEG compression ("Digital Compression and Coding of Continuous-Tone Still Images", ISO/IEC/0918-1).

An error rate of each bit subjected to JPEG compression is 0.1 to 0.2. In order to lower the bit error rate of JPEG compression to a −8 power of 10, it is necessary to provide each bit of an embedded watermark with a redundancy of ten times or higher, so that the values of a number of pixels are necessary to be changed. Since the values of a number of pixels and frequencies are required to be changed in order to lower the bit error rate, there is a tradeoff between a reliability of watermark data detection and a quality of contents.

An image compression process such as MPEG is necessary for an image having a large amount of data such as a moving image. In such a case, it is essential to detect watermark data under the condition of MPEG compression, i.e., under the condition of MPEG streams. It is also necessary to prepare a fundamental function of detecting a watermark under the image condition. In this case, a detector system is required to have a MPEG decoder, increasing its cost and process time.

SUMMARY OF THE INVENTION

It is an object of the present invention to provide digital watermark embedding/detecting techniques capable of minimizing the number of pixels to be changed in order to embed a digital watermark, while a reliability of detecting embedded data is maintained high.

It is another object of the invention to provide a digital watermark embedding method and system capable of suppressing as much as possible the quality of contents from being degraded upon modification of pixels.

It is still another object of the present invention to provide a digital watermark detecting method and system capable of detecting embedded data not only under the image condition but also under the condition of compression streams.

In order to achieve the above objects, the invention provides the following four solution methods.

According to a first aspect of the invention, a first data embedding and detecting approach is provided in which data is embedded in a two-dimensional image as a position pattern of blocks whose pixel values are changed. Accordingly, a reliability same as that obtained through conventional techniques can be retained irrespective of that the number of pixels whose values are changed is smaller.

According to a second aspect of the invention, a second data embedding and detecting approach is provided in which a sum (or average) of pixel values of partial images is changed to a specific value. Accordingly, it becomes possible to optimize the change amount of pixel values of partial images.

According to a third aspect of the invention, a data embedding system is provided which uses the first and second data embedding approaches.

According to a fourth aspect of the invention, a data detecting system is provided which uses the first and second data detecting approaches.

According to a fifth aspect of the invention, an approach is provided in which the first and second aspects are combined, namely, an image is divided into blocks of k×1 pixels and a sum or average of pixel values of each block is changed to a value satisfying particular conditions.

According to a sixth aspect of the invention, an approach is provided in which the size of each block embedded with watermark information based upon the fifth aspect is set to the size (e.g., 8×8 pixels) of a block used as the processing unit of a compression process such as JPEG and MPEG. Accordingly, embedded data under the image condition and under the condition of compression streams has one-to-one correspondence so that the embedded data can be detected both under the image condition and under the condition of compression streams.

Other objects, features and advantages of the present invention will become apparent from reading the following description of the invention taken in conjunction with the accompanying drawings.

BRIEF DESCRIPTION OF THE DRAWINGS

FIG. 4A is a diagram illustrating a method of detecting data from an image, according to an embodiment of the invention.

FIGS. 5A to 5C are diagrams illustrating an example of watermark embedding and detecting realized by software.

FIG. 6 is a flow chart illustrating an application of the invention to image data to be recorded in a recording medium, according to an embodiment of the invention.

FIG. 15 is a diagram illustrating a method of embedding data in an image according to an embodiment of the invention.

FIG. 16 is a diagram illustrating a method of embedding data in an image according to an embodiment of the invention.

FIG. 17 is a diagram illustrating a method of embedding data in an image according to an embodiment of the invention.

DETAILED DESCRIPTION OF THE PREFERRED EMBODIMENTS

Embodiments of the invention will be described with reference to the accompanying drawings.

Figure 1:
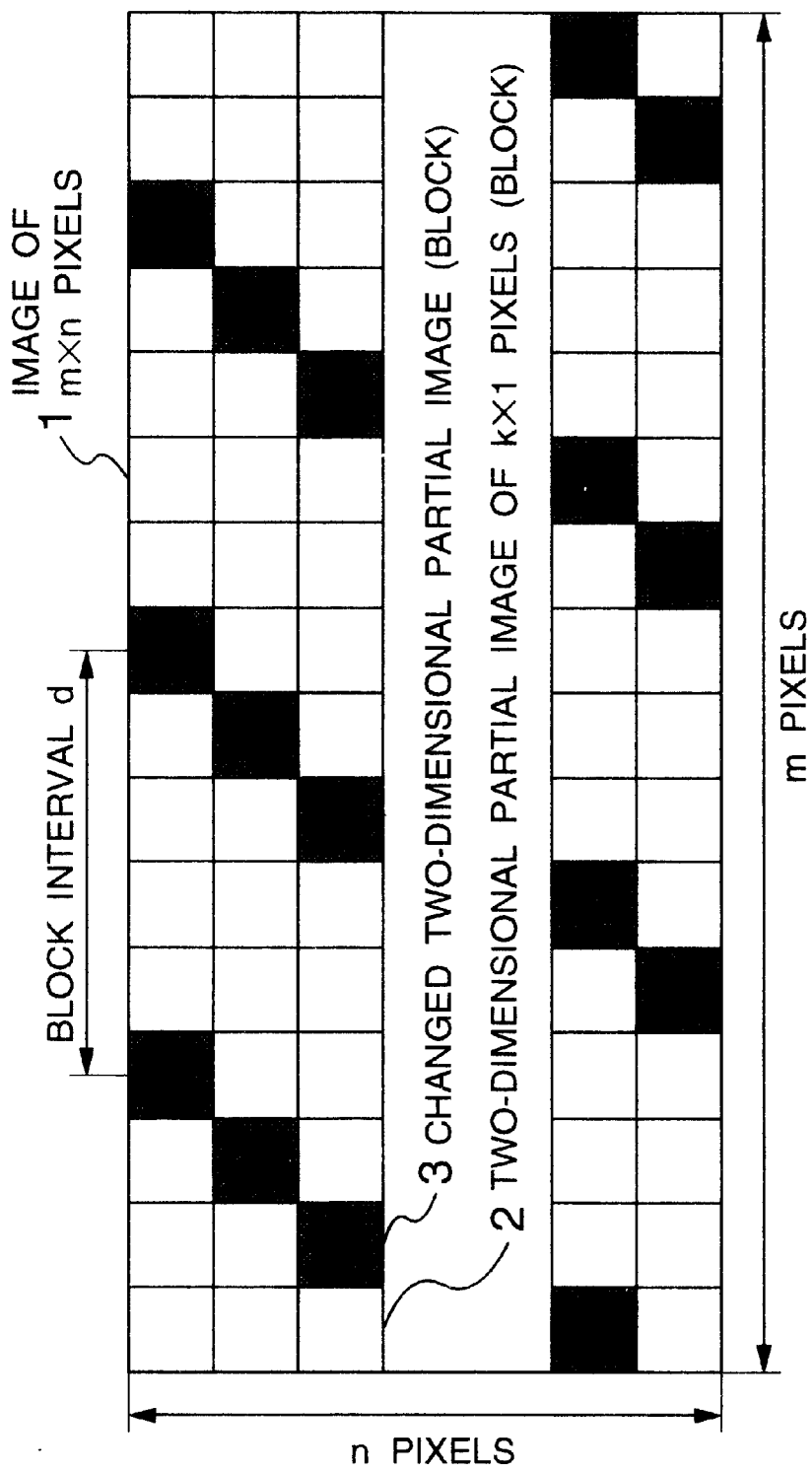
FIG. 1 is a diagram illustrating a method of embedding data in an image, according to an embodiment of the invention.

First, an embodiment according to the first aspect of the invention will be described with reference to FIG. 1 which is a schematic diagram illustrating an approach to embedding data in an image. In the first embodiment shown in FIG. 1, each block 2 divided from an image 1 having m×n pixels represents a two-dimensional partial image of k×1 pixels where m, n, k and 1 are positive integers. A block 3 with hatched lines has pixel values changed through a pixel value changing approach so that the block 3 has a specific value, the pixel value representing image information such as a luminance, a color difference, R, G and B color data. Information to be embedded is not represented by respective blocks, but it is represented by a block interval $d$. In this embodiment, the two-dimensional partial images whose pixel values are changed are disposed at the block interval $d$ which corresponds to a data value $x$ of a copyright notice for example, to thereby embed the data $x$ in the image. In embedding watermark information, the data $x$ is converted into the block interval $d$ and the pixel values are changed based upon this block interval $d$. In detecting a watermark, a block pattern converted from the image is detected to read the block interval and convert the block interval into the data. In this embodiment, although the block interval $d$ corresponding to the data $x$ is set constant, it may be changed. For example, three different block intervals d1, d2 and d3 corresponding to the data $x$ may be cyclically used to irregularly dispose blocks whose pixel values are changed.

Next, a pixel value changing approach according to a second embodiment of the second aspect of the invention will be described. In embedding a watermark, each pixel value in a block of a two-dimensional partial image shown in FIG. 1 is changed so that the sum of pixel values of the block takes a specific value near the sum. For example, each pixel value in the partial image is changed so that the sum of luminance values of pixels takes a multiple of a certain value.

Figure 2:
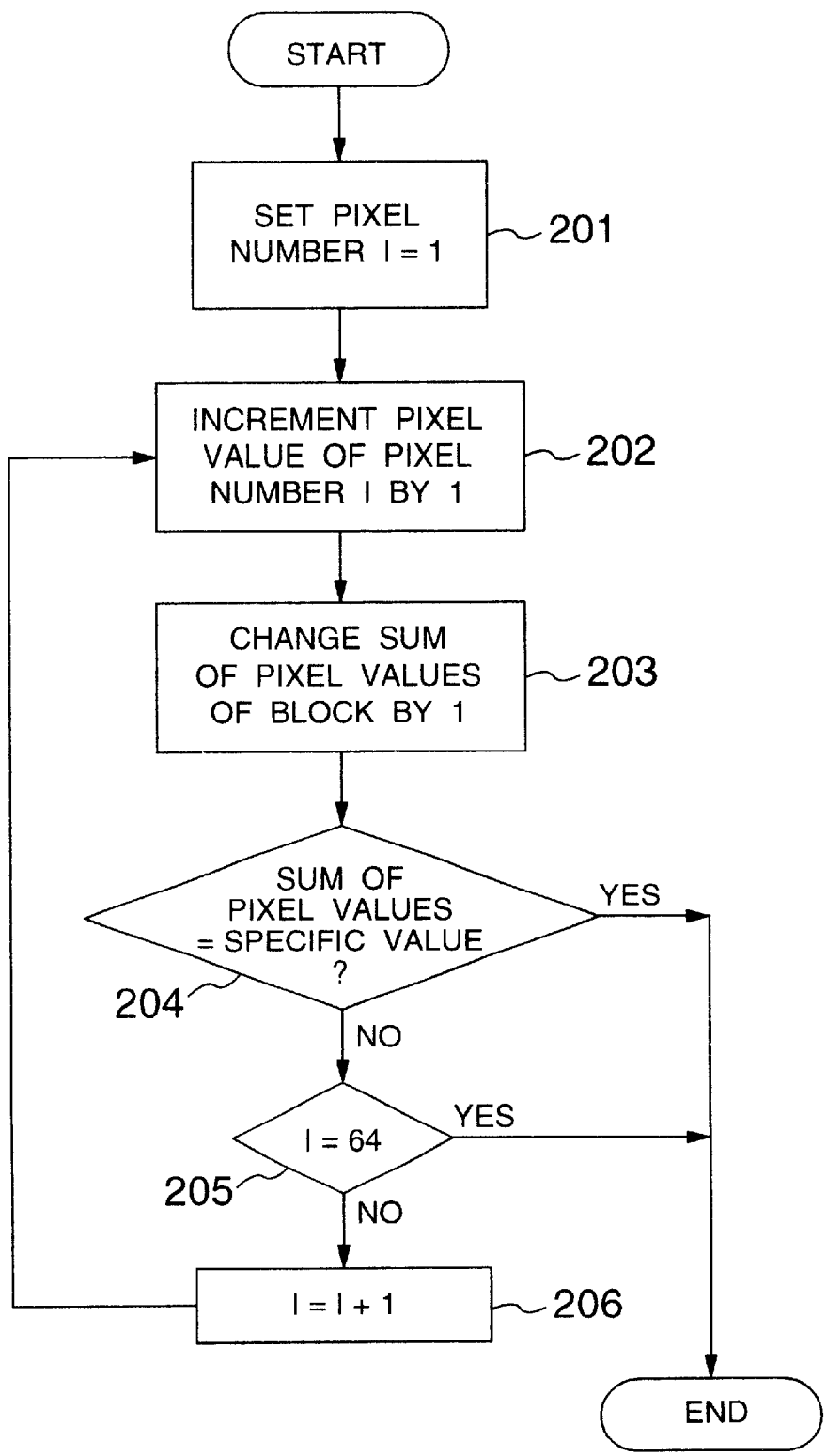
FIG. 2 is a flow chart illustrating a pixel value changing approach according to an embodiment of the invention.

This embodiment will be described with reference to FIG. 2 which is a flow chart illustrating the pixel value changing approach. Consider now that the size of the two-dimensional partial image is 8×8 pixels, and that each pixel value is changed so that the sum of pixel values of the partial image takes a multiple of "512", i.e., so that the sum of pixel values is smaller than a particular value (in this case "512"). It is assumed that pixels of each block are given pixel numbers from "1" to "64".

First at Step 201, "1" is set to a pixel number I. At Step 202, each of the pixel values of the pixel number "1" is incremented by "1".

At Step 203 the sum of pixel values of the two-dimensional partial image (block) having 8×8 pixels is incremented or decremented by "1" after the pixel value of the pixel number "1" is changed. It is checked at Step 204 whether the changed sum of the two-dimensional partial image is equal to the specific value of "512". If equal, this approach is terminated, whereas if not, the approach advances to Step 205 whereat it is checked whether the pixel number I is "64", i.e., whether all the pixels of the two-dimensional partial image have been changed. If changed, the approach is terminated, whereas if not, the pixel number I is incremented by "1" at Step 206 to change the pixel value of the next pixel.

If this approach to simply changing each pixel value has a fear that a third party may steal the watermark information, then a change amount in each pixel value representative of a luminance, a color difference, R, G, B or the like may be changed, as disclosed in the U.S. application being filed based on Japanese Patent Application No. 9-238031 filed on Sep. 3, 1997 by the present assignee, et al.

In detecting a watermark, the sum of pixel values of each two-dimensional partial image (block) is calculated to check whether the sum is the specific value or a value near the specific value and to detect the block whose pixel values were changed. In this case, a block is also detected, whose pixel values were not changed and its original sum was a value near the specific value. To deal with this issue, blocks can be detected at a higher precision if known pattern matching, majority decision, or the like is performed. Presumption of the specific value by a third party becomes difficult if a different specific value is used for each two-dimensional partial image (block) depending upon the position of each partial image.

Figure 3:
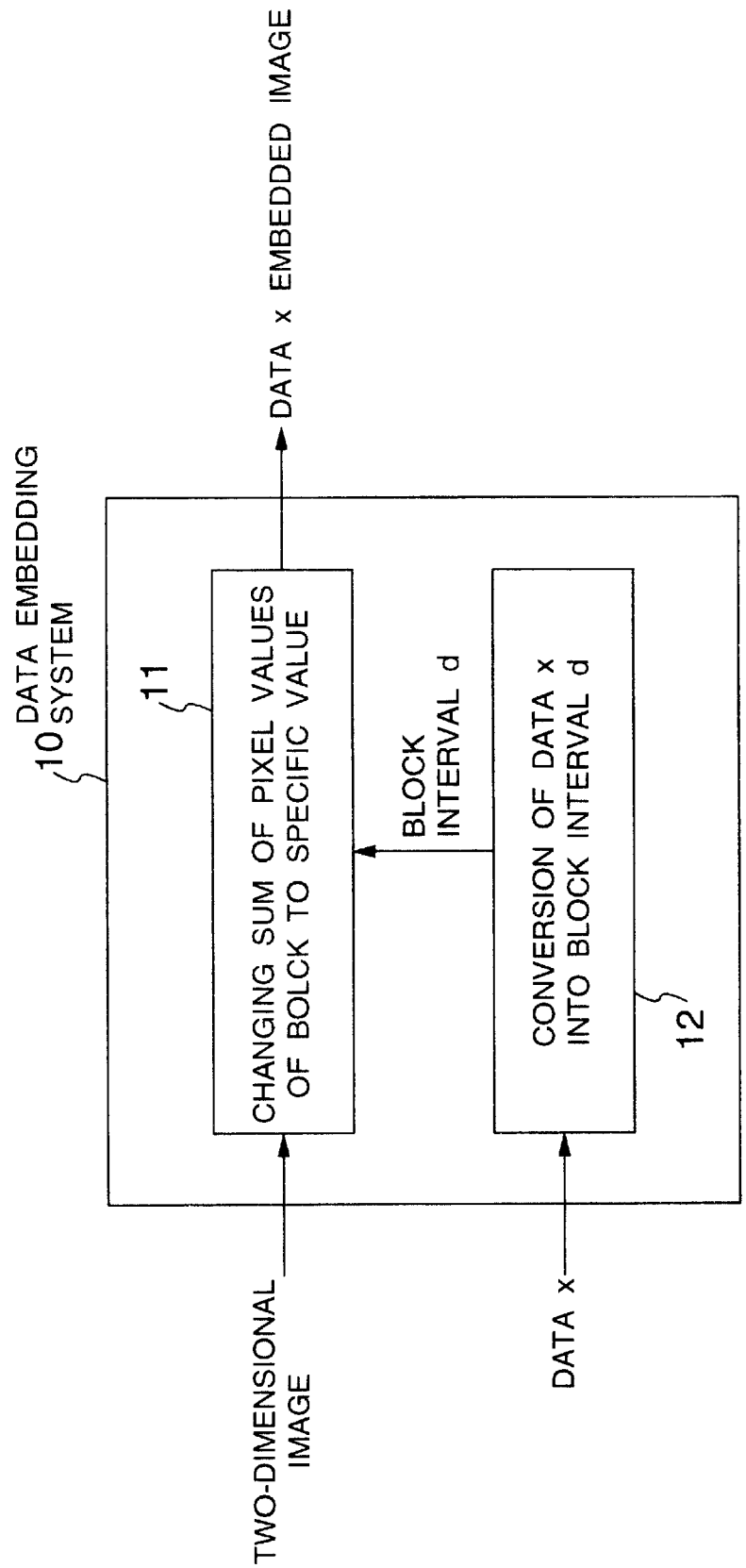
FIG. 3 is a diagram showing a data embedding system according to an embodiment of the invention.

Next, an embodiment according to the third aspect of the invention will be described with reference to FIG. 3 which is a schematic diagram showing a data embedding system using the data embedding approach of the first and second embodiments. In the third embodiment shown in FIG. 3, data x to be embedded is converted into the block interval $d$ through the pixel value changing approach of the first embodiment, and blocks whose pixel values are to be changed are determined. Next, the position information of the determined blocks is supplied to the image in which the data x is embedded, and the pixel values of each block is changed through the data embedding approach of the second embodiment.

Next, a fourth embodiment according to the third aspect of the invention will be described with reference to FIG. 4A which is a schematic diagram showing a data detecting system using the data detecting approach. In the fourth embodiment shown in FIG. 4A, blocks whose pixel values were changed are detected from two-dimensional partial images (blocks) with the data x being embedded, by a changed block detecting means which checks the specific value of each block from the sum of pixel values thereof. Next, the block interval between the blocks whose pixel values were changed is converted into the data x by a pattern detecting means, so that the data x can be reproduced from the watermark embedded image.

Figure 4B:
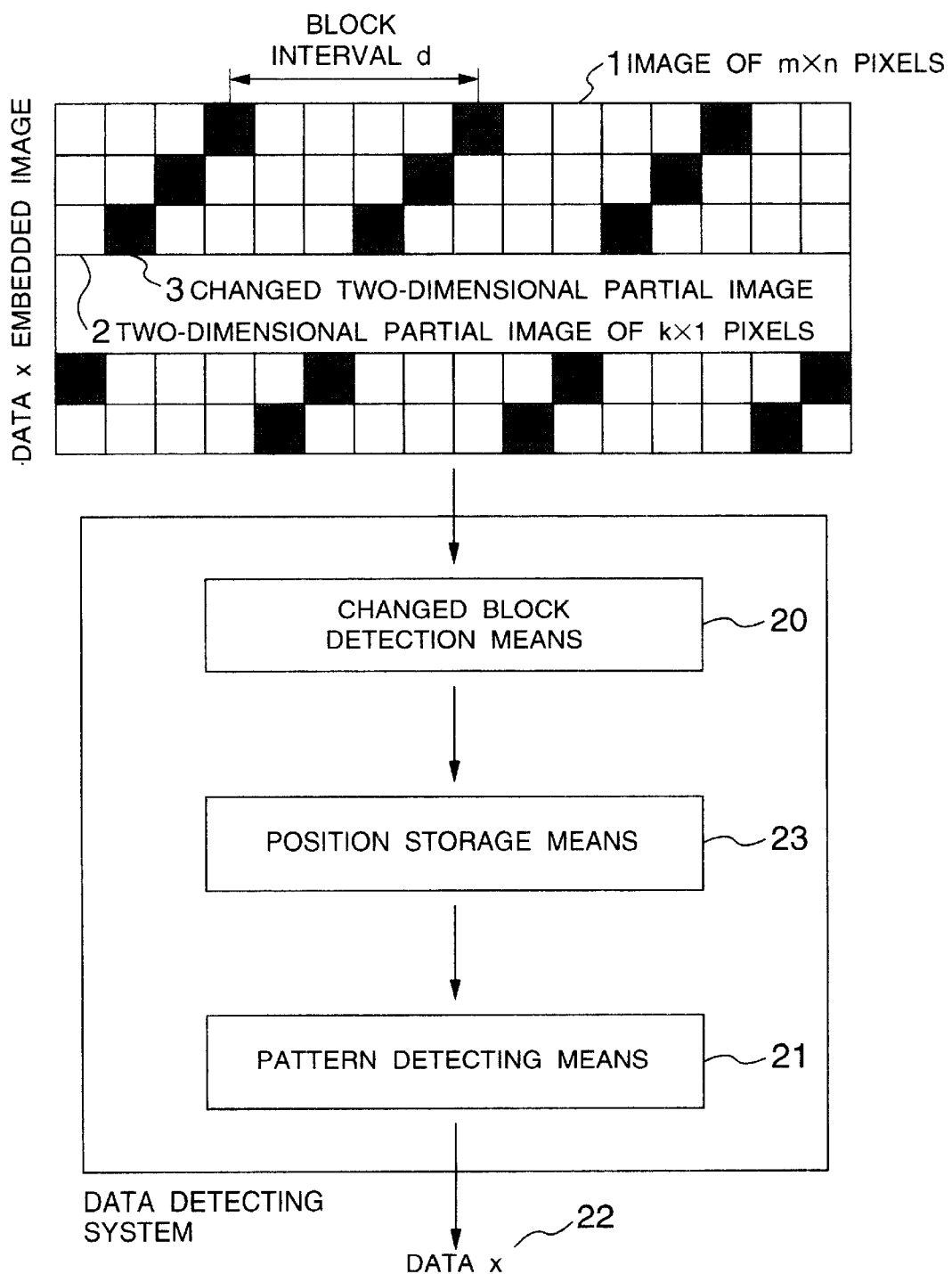
FIG. 4B is a diagram showing a data detecting system according to an embodiment of the invention.

FIG. 4B illustrates a modification of the fourth embodiment shown in FIG. 4A. In FIG. 4B, like elements to those shown in FIG. 4A are represented by identical reference numerals. Reference numeral 23 represents a storage means for storing position information of blocks to be supplied to a pattern detecting means 21. In this fifth embodiment, after the position information detected with the changed block detecting means 20 is temporarily stored in storage mans 23, a pattern is detected by the pattern detecting means 21 to reproduce the data x.

Figure 5A:
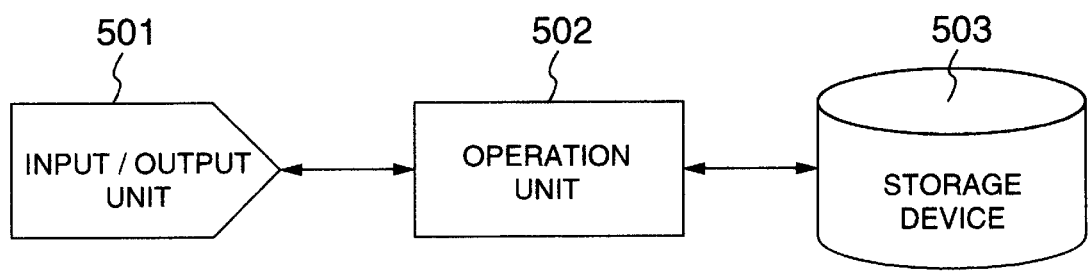
Figure 5B:
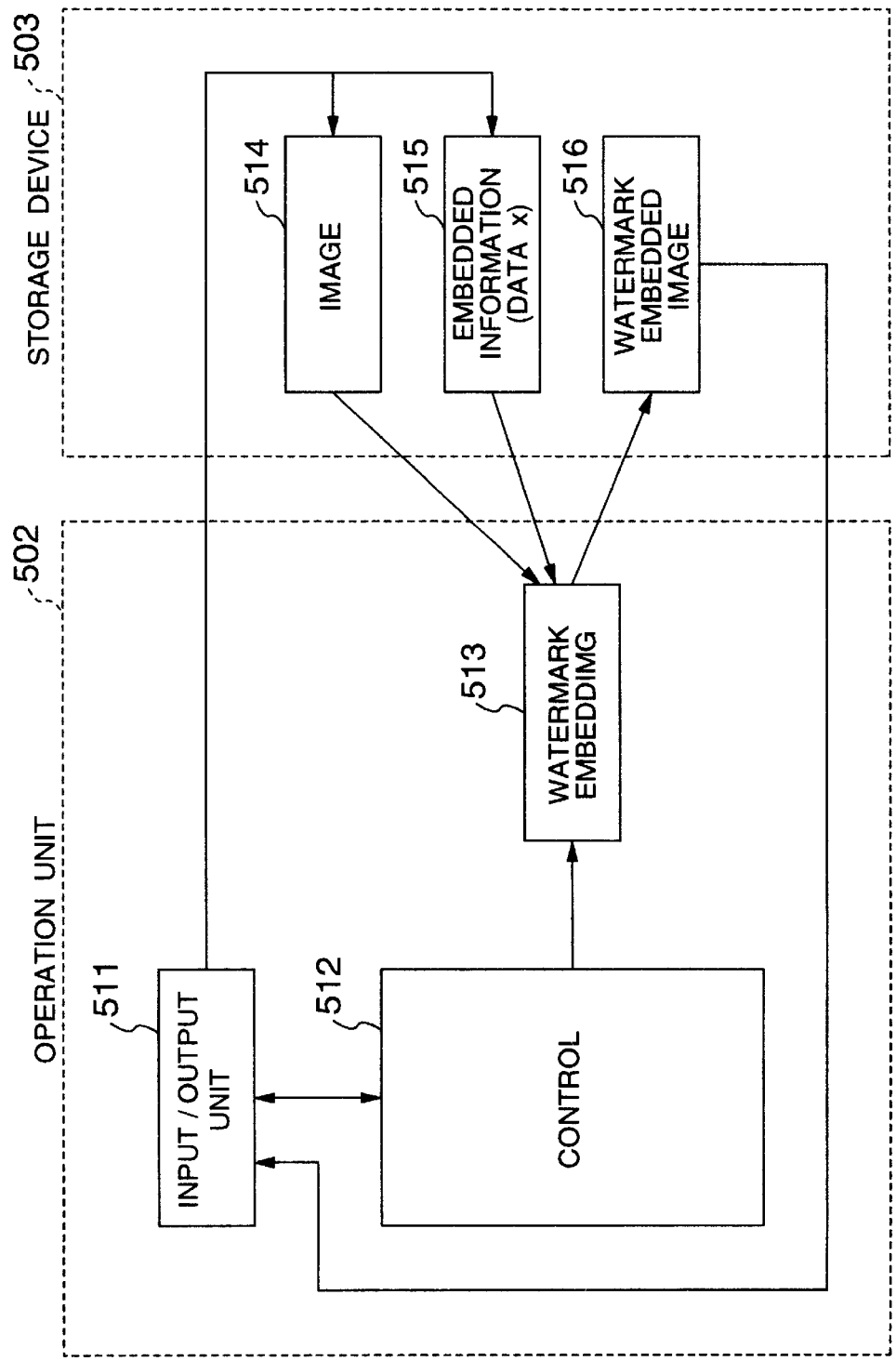

FIGS. 5A to 5C illustrate an example of a method of embodying watermark embedding and detecting of this invention by using software running on a computer.

FIG. 5A is a diagram illustrating a functional structure of the inside of a computer. In embedding a watermark, an image and embedding data are input from an input/output unit 501 and stored in a storage device 503. Next, an operation unit 502 executes a watermark embedding process, and a watermark embedded image is output from the input/output unit 501.

In detecting a watermark, a watermark embedded image is input from the input/output unit 501 and stored in the storage device 503. Next, the operation unit 502 executes a watermark detecting process, and embedded data is output from the input/output unit 501.

FIG. 5B is a diagram illustrating a functional structure of embedding a watermark. Reference numerals 511, 512, and 513 represent processes to be executed by a CPU of the computer. Reference numerals 514 to 516 represent data stored in the storage device 503 of the computer. An input/output unit 511 stores image data 514 and embedding information (data x) 515 in the storage device 503. In a watermark embedding process 513, the embedding information is converted into watermarking information which is embedded in image data 514. The watermark embedded image 516 is stored in the storage device. The watermark embedded image 516 stored in the storage device 503 is output from the input/output unit 501.

FIG. 5C is a diagram illustrating a functional structure of detecting a watermark. Reference numeral 521 represents a process to be executed by CPU of the computer. The input/output unit 511 stores a watermark embedded image 516 in the storage device 503. In the watermark detecting process 521, watermarking information is derived from the watermark embedded image 516 and converted into embedding information (data x ) which is stored in the storage device 503. The embedding information stored in the storage device 503 is output from the input/output unit 501.

FIG. 6 is a flow chart illustrating an operation of storing an image embedded with data in a recording medium according to a fifth embodiment of the invention. Reference numeral 32 represents a data embedding means of this invention, reference numeral 33 represents an image compressing means, and reference numeral 34 represents a formatting means specific to a recording medium 35. Digital watermark data 31 is embedded in a two-dimensional image 30 by the data embedding approach of this invention. The watermark embedded two-dimensional image is then compressed by the image compressing means 33, formatted to have a format specific to the recording medium 35, and stored in the recording medium 35. It is therefore possible to form a recording medium such as an optical disk which stores data such as a digital watermark embedded two-dimensional image.

Next, a sixth embodiment of the invention will be described. In this embodiment, watermark data can be detected both under the image condition and under the condition of compression streams.

Figure 7:
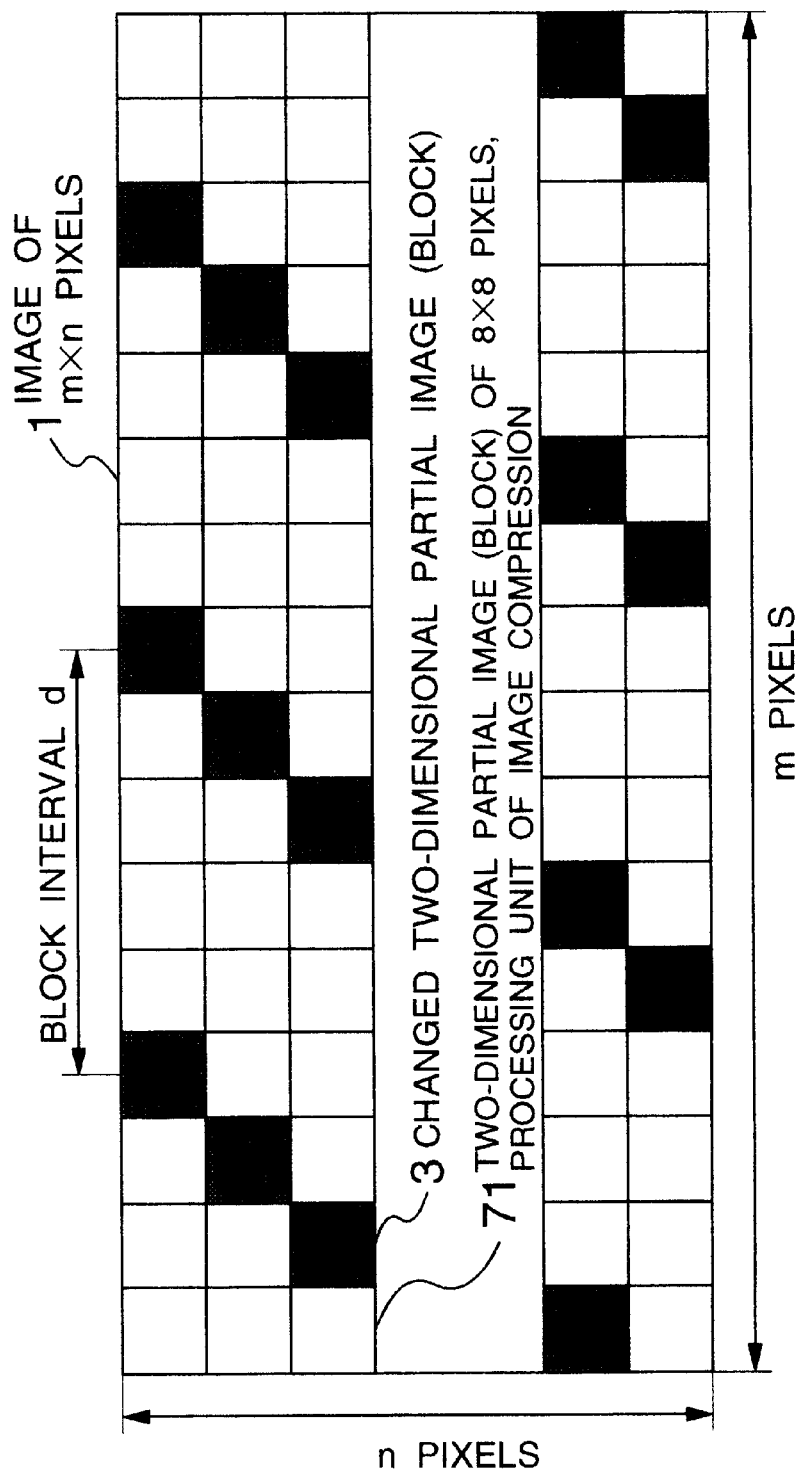
FIG. 7 is a diagram illustrating a method of embedding data in an image according to an embodiment of the invention.

FIG. 7 is a diagram illustrating an example of a method of embedding data in an image, the method being suitable for an image compression process. In FIG. 7, reference numeral 171 represents a two-dimensional partial image (block) of 8×8 pixels. This size (8×8 pixels) of the two-dimensional partial image 71 to be subjected to the pixel changing approach is an image processing unit of an image compression process such as JPEG and MPEG. Therefore, embedded information becomes hard to be lost during the image processing process. It is also known that sum of values of 8×8 pixels is a DC component value of I-frame under the condition of MPEG compression, i.e., MPEG streams. Therefore, the information embedded in such a manner that the sum of pixel values of each two-dimensional partial image takes the specific value, can be detected by judging whether or not the DC component value of I-frame under the condition of MPEG streams takes the above-described specific value and by deriving the interval of blocks satisfying the specific value.

With this embodiment method, it is possible to derive the embedded information both under the image condition and under the condition of compression streams. If detection from only under the condition of compression streams is used, it is not necessary for a detector system to have a MPEG decoder so that the cost of the system can be lowered.

Next, a seventh embodiment of the invention will be described.

Figure 8:
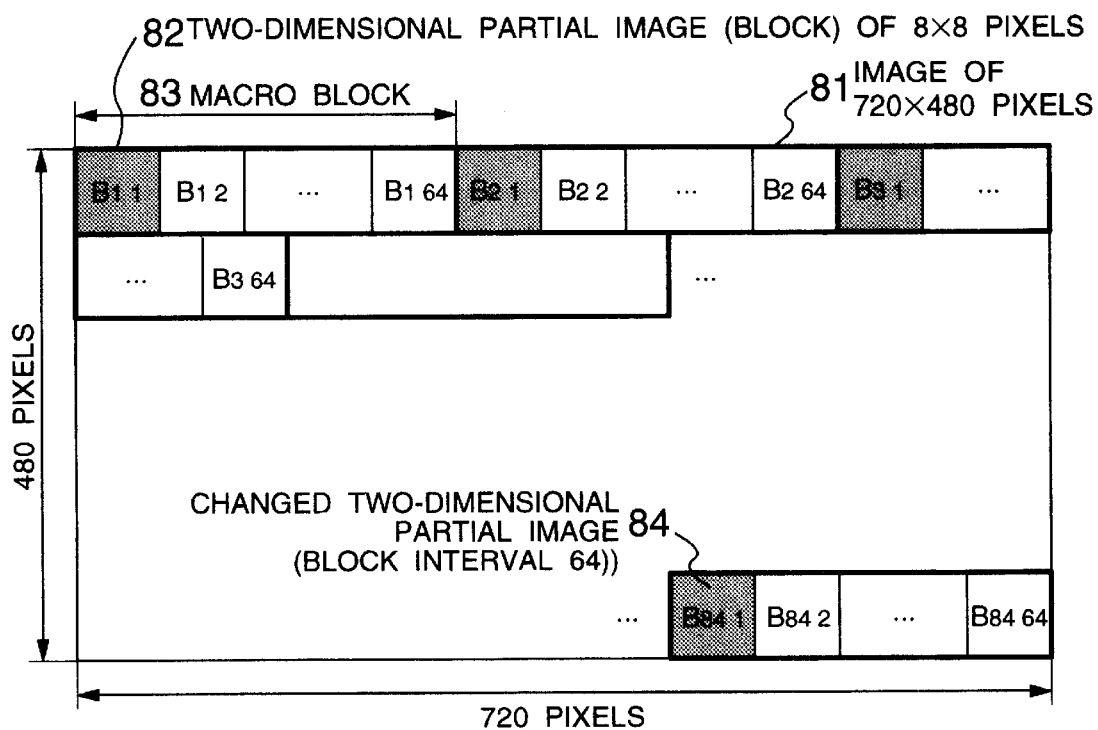
FIG. 8 is a diagram showing a system of embedding data in an image according to an embodiment of the invention.

FIG. 8 is a schematic diagram illustrating the format of data embedded in an image. In FIG. 8, an image 81 of 720×480 pixels is divided into two-dimensional partial images (blocks) 82 each being constituted of 8×8 pixels. A macro block 83 is constituted of 64 blocks. There are 84 macro blocks in the image. As shown, a y-th block in an x-th macro block is represented by Bxy, where x is an integer from 1 to 84 and y is an integer from 1 to 64. Blocks in a block pattern whose pixel values are changed are disposed at a constant block interval d (in this example, d=64). The embedding information is represented by a shift amount m (m=0 to 63) of a block whose pixel values are changed. In this example, watermark information of 64 types (6 bits) can be embedded, including block patterns of (B11, B21, . . . , B84 1), (B12, B22, . . . , B84 2), . . . , (B1 m+1, B2 m+1, . . . , B84 m+1), . . . , (B1 64, B2 64, . . . , B84 64).

In the example shown in FIG. 8, the block pattern (B11, B21, . . . , B84 1) 84 is embedded.

Figure 9:
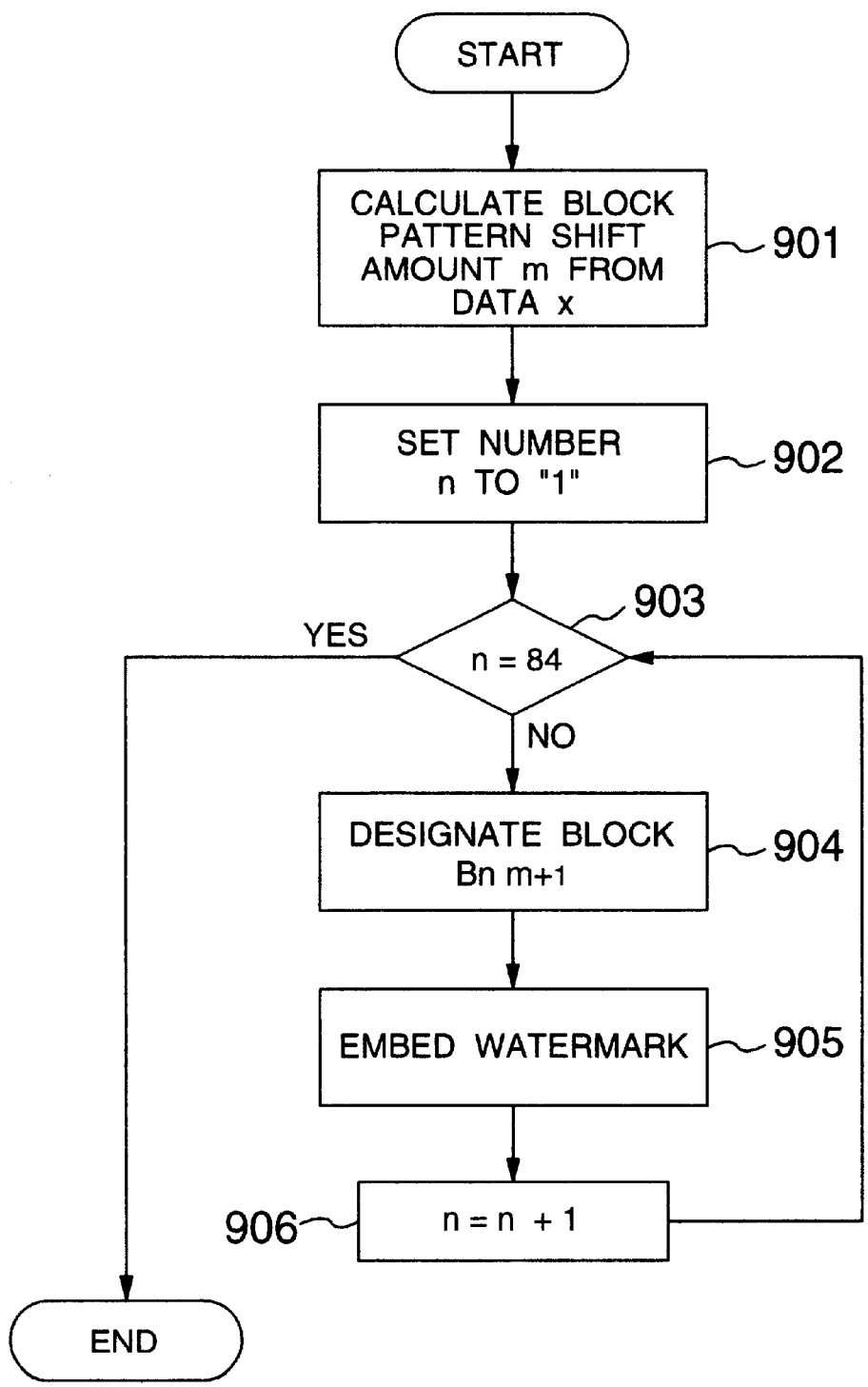
FIG. 9 is a flow chart illustrating a method of embedding data in an image according to an embodiment of the invention.

FIG. 9 is a flow chart illustrating the data embedding method.

At Step 901 a block pattern shift amount m is calculated from 6-bit data x. Step 902 and following Steps illustrate an operation of embedding watermark information in the block pattern (B1 m+1, B2 m+1, ..., B84 m+1) shifted by m blocks from the block pattern (B1, B21, ..., B84 1).

At Step 902 the number n of the macro block in which watermark information was embedded is set to "1".

At Step 903 it is checked whether the watermark information has been embedded in all the macro blocks (84 blocks). If embedded, the flow is terminated, whereas if not, the flow advances to Step 904.

At Step 904 the (m+1)-th block in the n-th macro block is designated, and at Step 905 watermark information is embedded in the designated block by changing the pixel values thereof.

Figure 10:
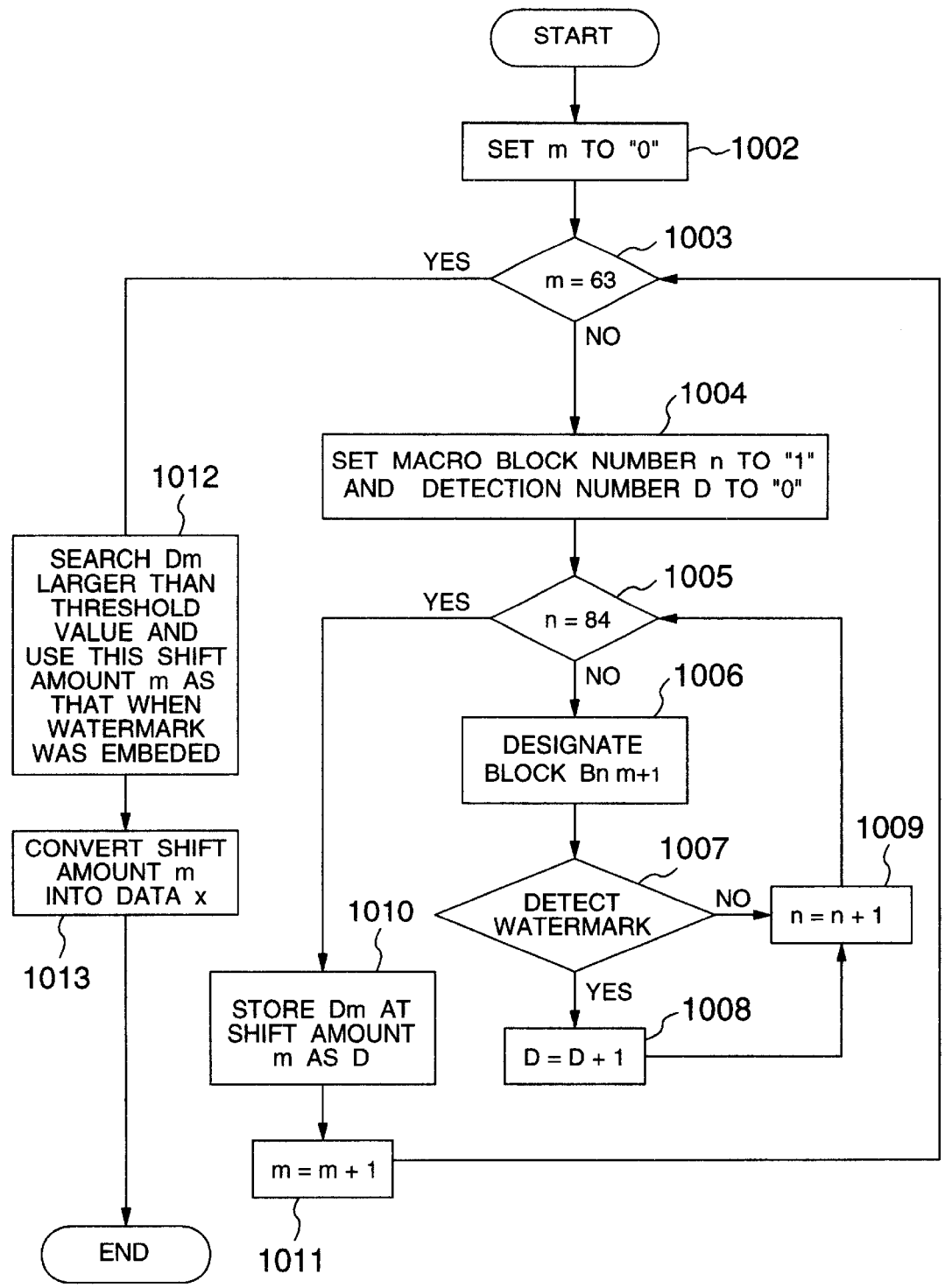
FIG. 10 is a flow chart illustrating a method of detecting data from an image according to an embodiment of the invention.

At Step 906 the number n of the macro block embedded with the watermark information is incremented by FIG. 10 is a flow chart illustrating the data detecting approach.

First, at Step 1002 the block pattern shift amount m is set to "0".

At Step 1003 it is checked whether detection number D temporarily stored in the system has been obtained for all the block patterns of 64 types. If obtained, the flow advances to Step 1012, whereas if not the flow advances to Step 1004. The detection number D indicates the number of blocks satisfying a particular rule. For example, the detection number D is the number of blocks each having a sum of luminance values equal to a multiple of "512".

At Step 1004, the macro block number n is set to "1" and the detection number D is set to "0".

At Step 1005 it is checked whether detection for all the macro blocks with the shift amount m has been completed. If completed, at Step 1010 a detection number Dm at the shift amount m is stored as the detection number D, and at Step 1011 the shift amount m is incremented by "1" to continue the detecting process at the new shift amount. If not completed at Step 1005, the flow advances to Step 1006 whereat the block Bn m+1 in the n-th macro block at the shift amount m is designated.

At Step 1007 it is checked from the pixel values of the designated block whether the watermark information can be detected. If detected, at Step 1008 the detection number D is incremented by "1", and thereafter at Step 1009 the macro block number n is incremented by "1" in order to designate the corresponding block in the next macro block. If not detected at Step 1007, the flow advances directly to Step 1009 whereat only the macro block number n is incremented by "1".

After the detection numbers Dm for all the shift amounts m are obtained, i.e., after it is judged at Step 1003 as m=63, at Step 1012 the detection number Dm larger than a threshold value is searched from the detection numbers Dm at respective shift numbers m and the shift amount m at the searched detection number Dm is used as the shift amount m when the watermark information was embedded. At Step 1013 the shift amount m is converted into the data x to derive the watermark information.

Next, an eighth embodiment of the invention will be described.

Figures 11, 12:
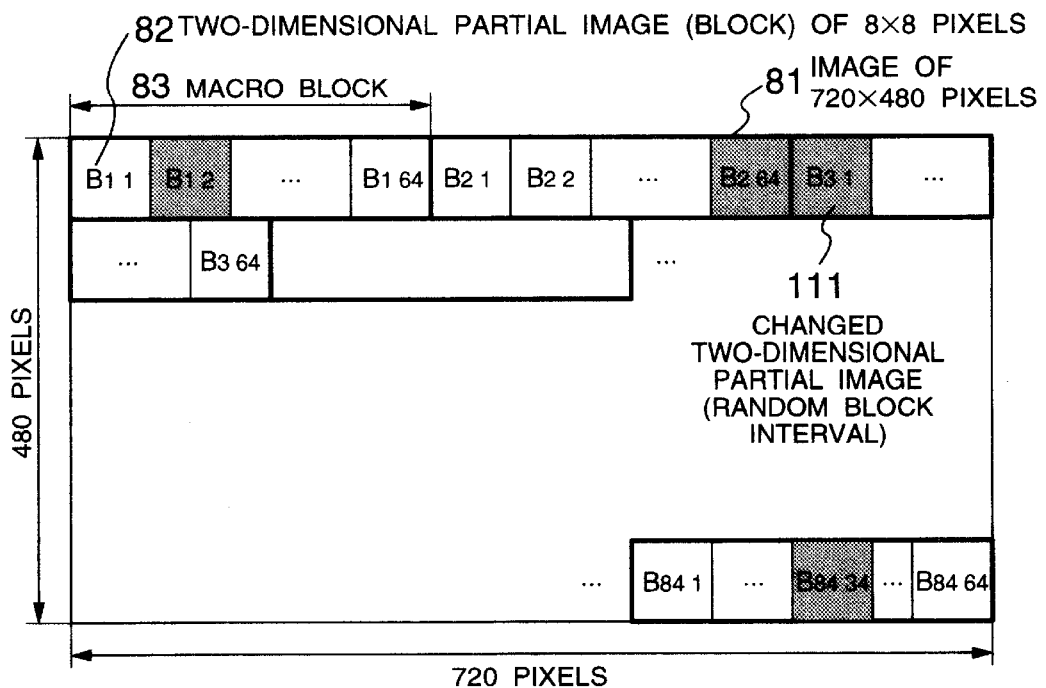
FIG. 11 is a diagram illustrating a method of embedding data in an image according to an embodiment of the invention.
FIG. 12 is a correspondence table illustrating a method of embedding data in an image according to an embodiment of the invention.

FIG. 11 is a schematic diagram illustrating the format of data embedded in an-image. Hatched blocks 111 constitute a block pattern.

A different point from the format shown in FIG. 8 resides in that the block intervals of the block pattern whose pixel values are changed, are not constant but random. If the block interval is constant as shown in FIG. 8, there is a fear that watermark information may be erroneously detected or easily removed illicitly, although depending on the type of an image.

In accordance with a correspondence table between data x and a block pattern shown in FIG. 12, blocks in each block pattern are randomly allocated to each macro block, and data x of 6 bits can be embedded. The block pattern shown in FIG. 11 corresponds to the block pattern "1" shown in the table of FIG. 12.

Figure 13:
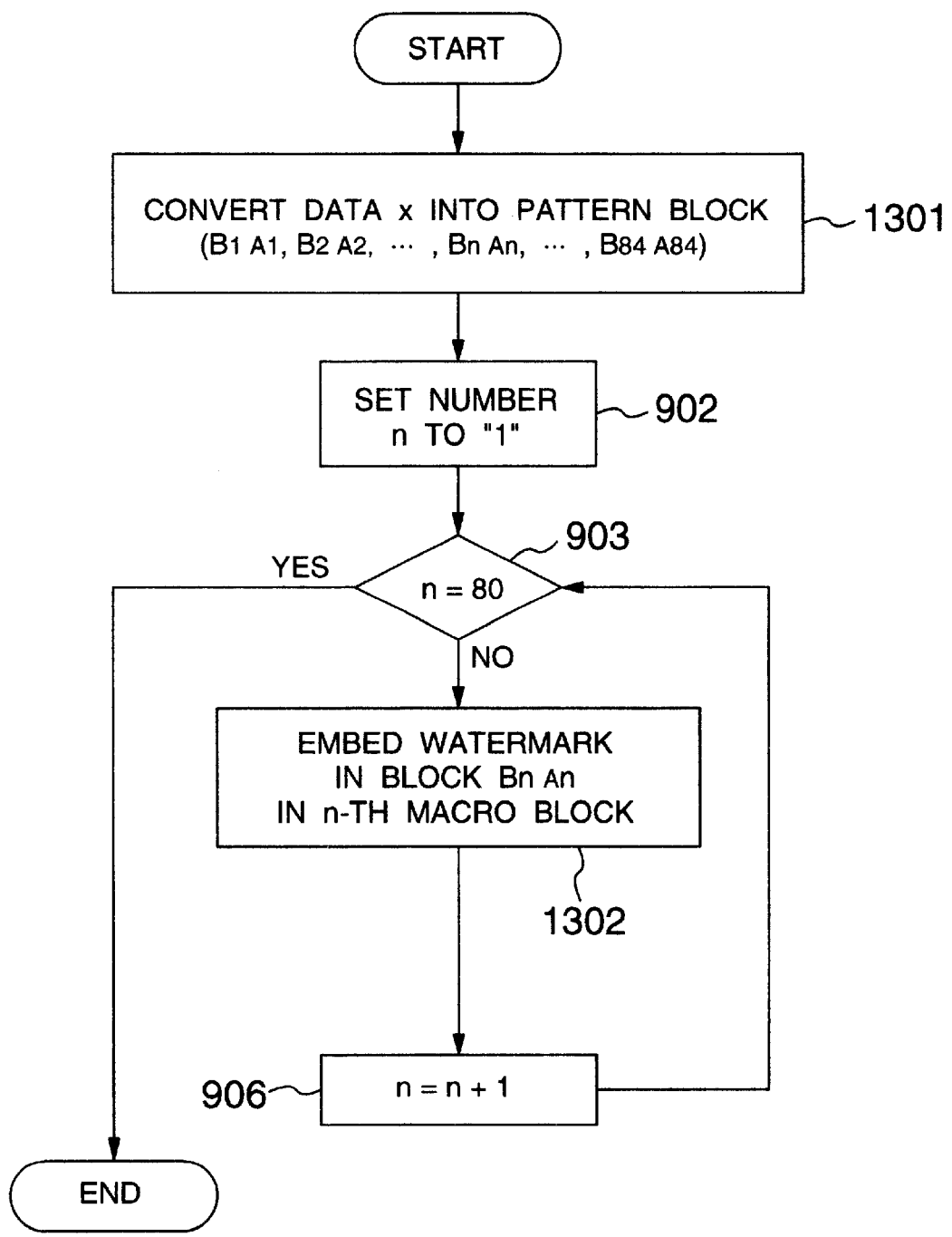
FIG. 13 is a flow chart illustrating a method of embedding data in an image according to an embodiment of the invention.

FIG. 13 is a flow chart illustrating the data embedding approach according to the eight embodiment.

At Step 1301, data x is converted into a block pattern by referring to the correspondence table shown in FIG. 12. At Step 1302 watermark information is embedded randomly in a block Bn An (An is a random number series from "0" to "64") of the n-th macro block. Other Steps correspond to those described with FIG. 9.

Figure 14:
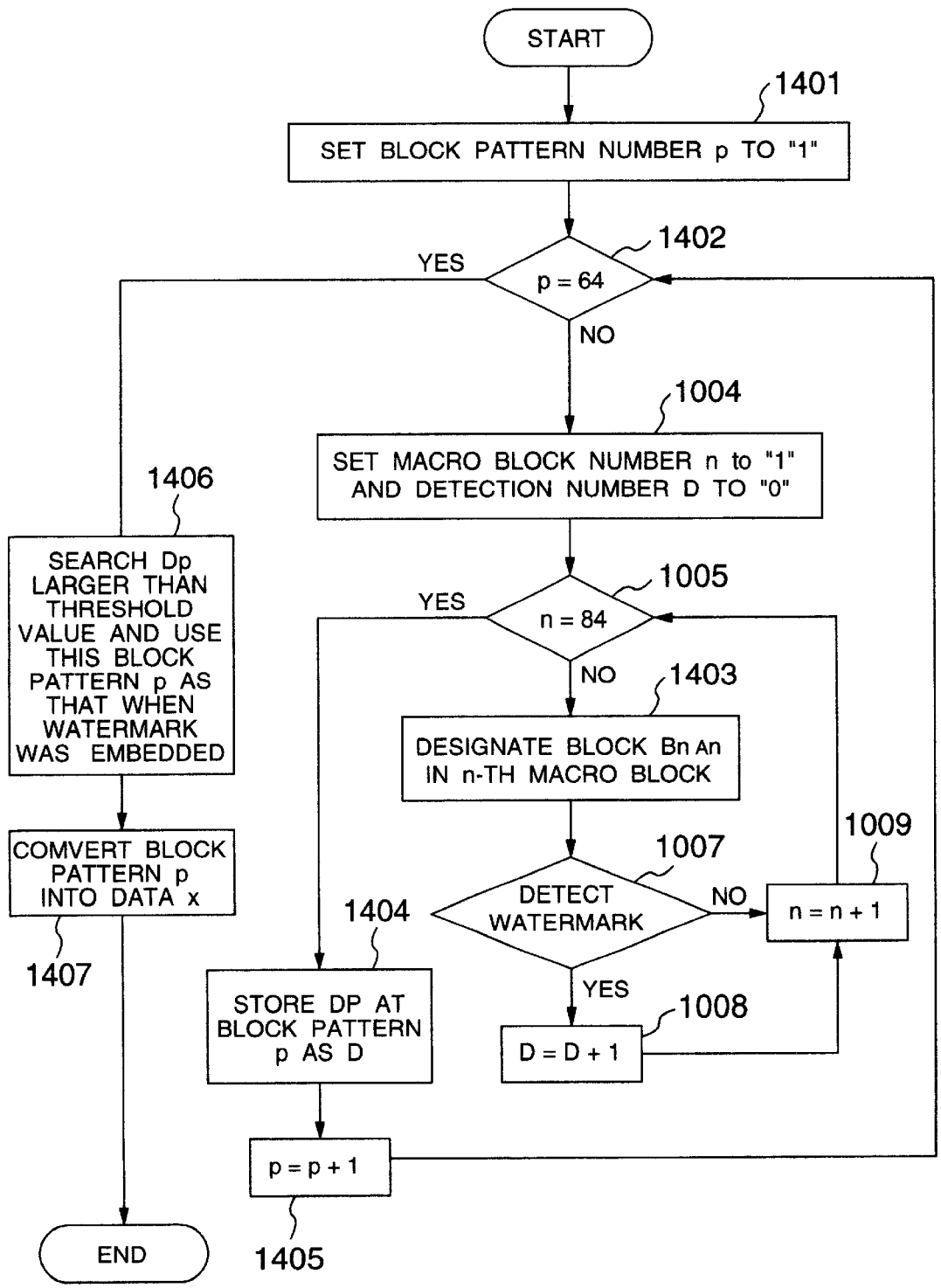
FIG. 14 is a flow chart illustrating a method of detecting data from an image according to an embodiment of the invention.

FIG. 14 is a flow chart illustrating the data detecting approach.

At Step 1401 the block pattern number p shown in FIG. 12 is set to "1".

At Step 1402 it is checked whether detection has been obtained for all the block patterns of 64 types. If obtained, the flow advances to Step 1406, whereas if not, the flow advances to Step 1004 whereat the macro block number n and detection number D are initialized.

If detection for all the 84 macro blocks in one block pattern has been completed at Step 1005, a detection number Dp at the block pattern p is stored at Step 1404 as the detection number D, and at Step 1405 the block pattern p is incremented by "1". If not completed at Step 1005, the flow advances to Step 1403 whereat the An-th block Bn An in the n-th macro block is designated and watermark information is detected at Step 1007.

If detection has been obtained for all the block patterns at the judgement Step 1402, then at Step 1402 the block pattern p detection number Dp larger than a threshold value is searched from the detection numbers Dp and the block pattern p at the searched detection number Dp is used as the block pattern p when the watermark information was embedded. At Step 1407 the block pattern p is converted into the data x by referring to the correspondence table shown in FIG. 12 to derive the watermark information.

Next, a ninth embodiment of the invention will be described. In the seventh and eighth embodiments, 6-bit watermark information can be embedded because the block interval is set to "64" without permitting any duplication of blocks between block patterns. This ninth embodiment aims to allow watermark information of 6 bits or larger to be embedded, by permitting duplication of blocks between block patterns while the number of blocks of each block pattern is maintained "84".

FIG. 15 is a schematic diagram of an image embedded with a 7-bit watermark information by the embodiment data embedding method. There are 128 block patterns in total. In FIG. 15, hatched blocks embedded with watermark information are shown disposed in respective macro blocks of each block pattern. The data embedding method same as the seventh embodiment is used for the block patterns 1 to 64. Namely, these block patterns 1 to 64 are represented by (B11, B21, ..., B84 1), (B12, B22, ..., B84 2), ..., (B1 64, B2 64, ..., B84 64). The block patterns 65 to 128 are formed in accordance the following rules, as illustrated in FIG. 15.

The block pattern p is represented by (B1 (p−1)mod64+1, B2 (p−2)mod64+2, ..., Bn (p−1)mod64+n, ..., B84

(p−1)mod64+84). A mod B is a remainder of A divided by B, and the second suffix of B takes "1" after "64". For example, B80 65=B80 1, B80 66=B80 2, and so on.

With this block pattern setting, the embedding position of a block in each macro block in one block pattern becomes essentially coincident with the embedding position of a corresponding macro block in another block pattern. The number of coincident embedding positions between arbitrary two block patterns is "2". For example, in the block patterns shown in FIG. 15, the watermark embedding position of the macro block 2 of the block pattern 65 is B2 2 which is the same as that of the macro block 2 of the block pattern 2. In all the block patterns, the number of coincident watermark embedding positions of the block patterns 65 and 2 is "2" and this is true for any of other combinations of two block patterns. In the above manner, since blocks between block patterns are duplicated, information of larger bits can be embedded. In this embodiment data embedding method, blocks may be determined randomly by using the eighth embodiment described above.

The data embedding method and detecting method of this embodiment are similar to those shown in FIGS. 13 and 14 except that An is set so as to match the ninth embodiment. The description of the methods is therefore omitted.

A tenth embodiment of the invention will be described with reference to FIGS. 16 and 17.

This embodiment aims to embed watermark information of 8 bits or larger, expanding the ninth embodiment.

FIGS. 16 and 17 are schematic diagrams of an image embedded with an 8-bit watermark information by the embodiment data embedding method. There are 256 block patterns in total. The other layout of the blocks is the same as that shown in FIG. 15.

Block patterns in FIGS. 16 and 17 are represented as in the following.

Block patterns p 1 to 64 are represented in the manner same as the ninth embodiment.

Block patterns p 65 to 128 are represented by (B1 (p−1)mod64+1, B2 (p−2)mod64+1+7, . . . , Bn (p−1) mod64+1+7(n−1), . . . , B84 (p−1)mod64+1+7*83).

Block patterns p 129 to 192 are represented by (B1 (p−1)mod64+1, B2 (p−2)mod64+1+11, . . . , Bn (p−1) mod64+1+11(n−1), . . . , B84 (p−1)mod64+1+11*83).

Block patterns p 193 to 256 are represented by (B1 (p−1)mod64+1, B2 (p−2)mod64+1+13, . . . , Bn (p−1) mod64+1+13(n−1), . . . , B84 (p−1)mod64+1+13*83).

Similar to the ninth embodiment, A mod B is a remainder of A divided by B, and the second suffix of B takes "1" after "64". For example, B80 65=B80 1, B80 66=B80 2, and so on.

With this block pattern setting, watermark information can be embedded while duplication of block patterns is minimized. Namely, by making uniform the number of arbitrary duplication block patterns, the number of duplications can be minimized.

According to the invention, it is possible to embed data such as digital watermark information in a two-dimensional image and to detect the embedded data from a data embedded two-dimensional image, while a change in the contents is minimized, the image quality is prevented from being degraded, and the data detection reliability is improved.

Furthermore, by designating the size of a two-dimensional partial image, not only embedded information becomes hard to be lost during an image compression process, but also the embedded information can be derived and reproduced both under the image condition and under the condition of compression streams. If detection only under the condition of compression streams is performed, it is not necessary for a detector system to install a MPEG decoder and the system cost can be lowered.

What is claimed is:

1. A data embedding method of embedding watermarking data x in a two-dimensional image having m horizontal pixels and n vertical pixels, comprising the steps of:

selecting two-dimensional partial images based on the watermarking data x, the two-dimensional partial image having k horizontal pixels (k×i=m, where k, i and m are positive integers) and l vertical pixels (l×j=n, where l, j and n are positive integers), wherein said two-dimensional partial images are selected from the two-dimensional image based on watermarking information to be embedded in the two-dimensional image so that positional relation between said selected two-dimensional partial images forms the watermarking information; and changing a value of each pixel of the selected two-dimensional partial image such that an arithmetic operation value of pixel values of the selected two-dimensional partial image takes a specific value to generate digital watermarks, thereby distinguishing the selected two-dimensional partial images from the other two-dimensional partial images not selected.

2. A recording medium storing a moving image embedded with the watermarking data x by the data embedding method according to claim 1 and compressed.

3. A data reproducing method comprising the steps of:

detecting the two-dimensional partial image whose pixel values were changed, the two-dimensional partial image corresponding to the watermarking data x embedded by the data embedding method according to claim 1;

storing information concerning the position of the two-dimensional partial image of the two-dimensional image detected by said detecting step in storage means; and detecting a pattern of the position information of the two-dimensional partial image stored in the storage means to reproduce the watermarking data x corresponding to said detected pattern.

4. A data reproducing method according to claim 3, where said pattern detecting step comprises detecting an interval between two-dimensional partial image images stored in said storage means to convert said interval between two-dimensional partial images into the watermarking data x.

5. A data reproducing system comprising:

two-dimensional partial image detecting means for detecting the two-dimensional partial image whose pixel values were changed, the two-dimensional partial image corresponding to the watermarking data x embedded by the data embedding method according to claim 1;

storing means for storing position information of the two-dimensional partial image of the two-dimensional image detected by said detecting step; and pattern detecting means for detecting a pattern of the position information of the two-dimensional partial image stored in the storage means.

6. A data embedding method according to claim 1, wherein said selecting step comprises converting said embedded data x into an interval between two-dimensional partial images to select the two-dimensional partial image whose pixel values are to be changed so as to be disposed at said interval between two-dimensional partial images.

7. A data embedding method according to claim 1, wherein said operation value is sum value.

8. A data embedding system for embedding watermarking data x in a two-dimensional image having m horizontal pixels and n vertical pixels, comprising:

selecting means for selecting two-dimensional partial images based on the watermarking data x, the two-dimensional partial image having k horizontal pixels (k xi=m, k, i and m are positive integers) and e vertical pixels (lxj=n, e, j and n are positive integers), wherein said two-dimensional partial images are selected from the two-dimensional image based on watermarking information to be embedded in the two-dimensional image so that positional relation between said selected two-dimensional partial images forms the watermarking information; and pixel value changing means coupled to said selecting means for changing a value of each pixel of the selected two-dimensional partial image such that an arithmetic operation value of pixel values of the selected two-dimensional partial image takes a specific value to generate digital watermarks, thereby distinguishing the selected two-dimensional partial images from the other two-dimensional partial images not selected.

9. A data embedding method according to claim 8, wherein said operation value is a sum value.

10. A method of embedding watermarking information in two dimensional image data, comprising the steps of:

dividing the two-dimensional image data into a plurality of blocks;

selecting a partial set of blocks based on the watermarking information from a plurality of divided blocks, wherein said partial set of blocks are selected from the two-dimensional image data based on said watermarking information to be embedded in the two-dimensional image data so that positional relation between said selected partial set of blocks forms the watermarking information; and changing arithmetic values of image data in a block of the selected partial set of blocks so as to satisfy a particular condition to generate digital watermarks, thereby distinguishing said selected partial set of blocks from other partial sets of blocks.

11. A method according to claim 10, wherein the block is a two-dimensional partial image constituting a compression processing unit.

12. A method according to claim 10, wherein the block is a two-dimensional partial image, and the values of image data are a sum of luminances of pixels in each block.

13. A method according to claim 10, wherein the partial set of blocks corresponding to the watermarking information is selected depending upon the watermarking information and random integers.

14. A method of embedding watermarking information in two dimensional image data, comprising the steps of:

dividing the two-dimensional image data into a plurality of blocks;

selecting a partial set of blocks based on the watermarking information from a plurality of divided blocks, wherein said partial set of blocks are selected from the two-dimensional image data based on said watermarking information to be embedded in the two-dimensional image data so as to form a pattern corresponding to the watermarking information; and changing arithmetic values of image data in a block of the selected partial set of blocks so as to satisfy a particular condition to thereby generate digital watermarks, wherein the partial set of blocks is selected so as not to duplicate blocks between types of the watermarking information, if A is N/M or smaller where A is the number of types of the watermarking information, N is a total sum of blocks, and M is the number of partial sets (macro blocks) of blocks and N and M are positive integers.

15. A method of embedding watermarking information in two dimensional image data, comprising the steps of:

dividing the two-dimensional image data into a plurality of blocks;

selecting a partial set of blocks based on the watermarking information from a plurality of divided blocks, wherein said partial set of blocks are selected from the two-dimensional image data based on said watermarking information to be embedded in the two-dimensional image data so as to form a pattern corresponding to the watermarking information; and changing arithmetic values of image data in a block of the selected partial set of blocks so as to satisfy a particular condition to thereby generate digital watermarks, wherein the partial set of blocks is selected so as to duplicate blocks between types of the watermarking information, a difference of duplicated block numbers between arbitrary two partial sets of blocks being set to 0 or 1, if A larger than N/N where A is the number of types of the watermarking information, N is a total sum of blocks, and M is the number of partial sets (macro blocks) of blocks and N, M are positive integers.

16. A method of reading watermarking information embedded in two-dimensional image data, comprising the steps of:

dividing the two-dimensional image data into a plurality of blocks;

storing partial sets of blocks in correspondence with each type of the watermark information;

judging whether a value of image data of each block satisfies a specific condition;

comparing sets of blocks satisfying the specific condition with the partial sets of blocks and selecting a partial set of blocks having the number of blocks common in both the set of blocks and the partial set of blocks larger than a predetermined value; and judging information corresponding to the selected partial set of blocks as the watermarking information, wherein the watermarking information has been embedded into the two-dimensional image by selecting a partial set of blocks based on the watermarking information, and wherein partial set of blocks is selected from the two-dimensional image data so as to form a pattern corresponding to the watermarking information to be embedded into the two-dimensional data.

17. A method according to claim 16, wherein the two-dimensional image data is compressed image data, and whether the value of image data of each block satisfies the specific condition is judged from a correspondence between a value of compressed data and a value of image data.

18. A system for embedding watermarking information in two-dimensional image data, comprising:

means for dividing the two-dimensional image data into a plurality of blocks;

means for selecting a partial set of blocks based on the watermarking information from a plurality of divided blocks and changing arithmetic values of image data in a block of the selected partial set of blocks so as to satisfy a particular condition to thereby generate digital watermarks, wherein said partial set of blocks are selected from the two-dimensional image data based on said watermarking information to be embedded in the two-dimensional image data so that positional relation between said selected partial set of blocks forms the watermarking information.

19. A system according to claim 18, wherein the block is a two-dimensional partial image constituting a compression processing unit.

20. A system according to claim 18, wherein the block is a two-dimensional partial image, and the values of image data are a sum of luminances of pixels in each block.

21. A method according to claim 18, wherein the partial set of blocks corresponding to the watermarking information is selected depending upon the watermarking information and random integers.

22. A system for embedding watermarking information in two-dimensional image data, comprising:

means for dividing the two-dimensional image data into a plurality of blocks;

means for selecting a partial set of blocks based on the watermarking information from a plurality of divided blocks and changing arithmetic values of image data in a block of the selected partial set of blocks so as to satisfy a particular condition to thereby generate digital watermarks, wherein said partial set of blocks are selected from the two-dimensional image data based on said watermarking information to be embedded in the two-dimensional image data so as to form a pattern corresponding to the watermarking information, wherein the partial set of blocks is selected so as not to duplicate blocks between types of the watermarking information, if A is N/N or smaller where A is the number of types of the watermarking information, N is a total sum of blocks, and N is the number of partial sets (macro blocks) of blocks and N and N are positive integers.

23. A system for embedding watermarking information in two-dimensional image data, comprising:

means for dividing the two-dimensional image data into a plurality of blocks;

means for selecting a partial set of blocks based on the watermarking information from a plurality of divided blocks and changing arithmetic values of image data in a block of the selected partial set of blocks so as to satisfy a particular condition to thereby generate digital watermarks, wherein said partial set of blocks are selected from the two-dimensional image data based on said watermarking information to be embedded in the two-dimensional image data so as to form a pattern corresponding to the watermarking information, and wherein the partial set of blocks is selected so as to duplicate blocks between types of the watermarking information, a difference of duplicated block numbers between arbitrary two partial sets of blocks being set to 0 or 1, if A larger than N/N where A is the number of types of the watermarking information, N is a total sum of blocks, and N is the number of partial sets (macro blocks) of blocks and N and N are positive integers.

24. A system for reading watermarking information embedded in two-dimensional image data, comprising:

means for dividing the two-dimensional image data into a plurality of blocks;

means for storing partial sets of blocks in correspondence with each type of the watermark information;

means for judging whether a value of image data of each block satisfies a specific condition;

means for comparing sets of blocks satisfying the specific condition with the partial sets of blocks and selecting a partial set of blocks having the number of blocks common in both the set of blocks and the partial set of blocks larger than a predetermined value; and means for judging information corresponding to the selected partial set of blocks as the watermarking information, wherein the watermarking information has been embedded into the two-dimensional image by selecting a partial set of blocks based on the watermarking information, and wherein partial set of blocks is selected from the two-dimensional image data so as to form a pattern corresponding to the watermarking information to be embedded into the two-dimensional data.

25. A system according to claim 24, wherein the two-dimensional image data is compressed image data, and whether the value of image data of each block satisfies the specific condition is judged from a correspondence between a value of compressed data and a value of image data.

* * * * *